(12) United States Patent
Hua et al.

(10) Patent No.: US 8,205,108 B2
(45) Date of Patent: Jun. 19, 2012

(54) METHOD AND MODULE FOR POWER DETECTION AND PERIPHERAL APPARATUS USING THE SAME

(75) Inventors: Chih-Hsiung Hua, Hsinchu (TW);
Ing-Ming Lee, Hsinchu (TW);
Wei-Kuang Weng, Hsinchu (TW)

(73) Assignee: Lite-On It Corporation, Hsinchu (TW)

( * ) Notice: Subject to any disclaimer, the term of this patent is extended or adjusted under 35 U.S.C. 154(b) by 396 days.

(21) Appl. No.: 12/554,267

(22) Filed: Sep. 4, 2009

(65) Prior Publication Data
US 2010/0257395 A1 Oct. 7, 2010

(30) Foreign Application Priority Data
Apr. 3, 2009 (CN) .................. 2009 1 0133842

(51) Int. Cl.
*G06F 1/28* (2006.01)
(52) U.S. Cl. ...................... 713/340; 713/300

(58) Field of Classification Search .................. None
See application file for complete search history.

(56) References Cited

U.S. PATENT DOCUMENTS

| | | | |
|---|---|---|---|
| 2006/0047880 A1* | 3/2006 | Lindblom et al. | 710/305 |
| 2007/0139838 A1* | 6/2007 | Huang | 361/93.1 |
| 2007/0177322 A1* | 8/2007 | Jacobs | 361/100 |
| 2008/0250261 A1* | 10/2008 | Nguyen et al. | 713/340 |
| 2009/0199031 A1* | 8/2009 | Zhang et al. | 713/323 |

* cited by examiner

*Primary Examiner* — Dennis M Butler
(74) *Attorney, Agent, or Firm* — Rabin & Berdo, P.C.

(57) ABSTRACT

A power detection method applied to a peripheral apparatus is provided. The method includes the following steps. First, a power signal is received from a data communication interface. Next, it is determined that whether the power signal is able to drive a main function device of the peripheral apparatus. Then, according to the determination result, the power signal is selectively provided to the main function device to drive the main function device.

25 Claims, 4 Drawing Sheets

METHOD AND MODULE FOR POWER DETECTION AND PERIPHERAL APPARATUS USING THE SAME

This application claims the benefit of Chinese application Serial No. 200910133842.3, filed Apr. 3, 2009, the subject matter of which is incorporated herein by reference.

BACKGROUND OF THE DISCLOSURE

1. Technical Field

The present disclosure relates in general to a method and a module for power detection and a peripheral apparatus using the same, and more particularly to a method and a module for determining whether a power signal has sufficient driving power and a peripheral apparatus using the same.

2. Description of the Related Art

A portable information processing apparatus, such as a notebook computer, usually has the characteristics of light weight and small volume for the user's convenience of carrying it. Thus, in order to further reduce the volume and weight of the notebook computers, some of these notebook computers, the mini notebook computers especially, have no longer equipped with certain input/output devices, such as the optical disc drive (ODD). Such a notebook computer may utilize an external ODD, such as an external slim ODD, provided by certain manufacturers to access an optical disc. Besides, the manufacturers also provide an external device, such as an external hard drive, which has mass storage space and is convenient to carry.

Making use of the above-mentioned external device conventionally requires an additional power device, such as an AC adaptor, to provide sufficient power. Nevertheless, some external devices now may adopt another manner for receiving power through some data communication interfaces that not only transfer data but also provide power. For example, the universal serial bus (USB) defines an interface with the power at a voltage of about 5 V and a current of about 0.5 A. Hence, the current external hard drives can utilize the power obtained through the USB transmission line as well as communicate with a computer so that an additional AC adaptor becomes unnecessary.

However, some external devices with higher power consumption, such as the ODD, may need to draw a current higher than 0.5 A, such as a current of 0.6 to 0.9 A. In this case, if the USB transmission line is used to provide the external ODD with power directly, it may be unable to ensure that the external ODD can operate stably and normally. It is thus evident that the way of directly providing power by using the USB transmission line may risk the data on unstable access, and is not suitable for different types of external devices, especially those with higher power consumption. If such way of providing power is applied to an external ODD, the user may suffer from the risk of unstable data access, which may cause the user lose data unexpectedly, or degrade the system operation as a whole.

SUMMARY OF THE DISCLOSURE

The present disclosure is related to a method and a module for power detection and a peripheral apparatus using the same. It is determined whether a power signal, such as a power signal received from a data communication interface, is able to drive a main function device or not. In addition, the power signal is selectively provided to the main function device to drive the main function device according to the determination result. Therefore, it is able to prevent the main function device from operating unstably, ensure that the user can make use of the main function device normally, and avoid the situations such as unexpected data lose or degradation of the entire system operation.

According to an aspect of the present disclosure, a power detection method applied to a peripheral apparatus is provided. The method includes the following steps. First, a power signal is received from a data communication interface. Next, it is determined that whether the power signal is able to drive a main function device of the peripheral apparatus. Following that, according to the determination result, the power signal is selectively provided to the main function device to drive the main function device.

According to another aspect of the present disclosure, a peripheral apparatus is provided. The apparatus includes a main function device and a power detection module. The power detection module is for receiving a power signal from a data communication interface. The power detection module is further for determining whether the power signal is able to drive the main function device. The power detection module is then for selectively providing the power signal to the main function device to drive the main function device according to the determination result.

According to another aspect of the present disclosure, a power detection module applied to a peripheral apparatus is provided. The power detection module includes a load simulation unit and a detection control unit. The load simulation unit is for drawing a predetermined current corresponding to a power signal from a data communication interface. The detection control unit is for controlling the load simulation unit to draw the predetermined current. The detection control unit is further for determining whether a supplied voltage corresponding to the power signal is lower than a predetermined voltage, so as to determine whether the power signal is able to drive the main function device. If the detection control unit determines that the supplied voltage is lower than the predetermined voltage, the detection control unit determines that the power signal is unable to drive the main function device and will not provide the power signal to the main function device.

It is to be understood that both the foregoing general description and the following detailed description are exemplary and explanatory only and are not restrictive of the disclosed embodiments, as claimed. The following description is made with reference to the accompanying drawings.

DETAILED DESCRIPTION OF THE DISCLOSURE

Figure 1:
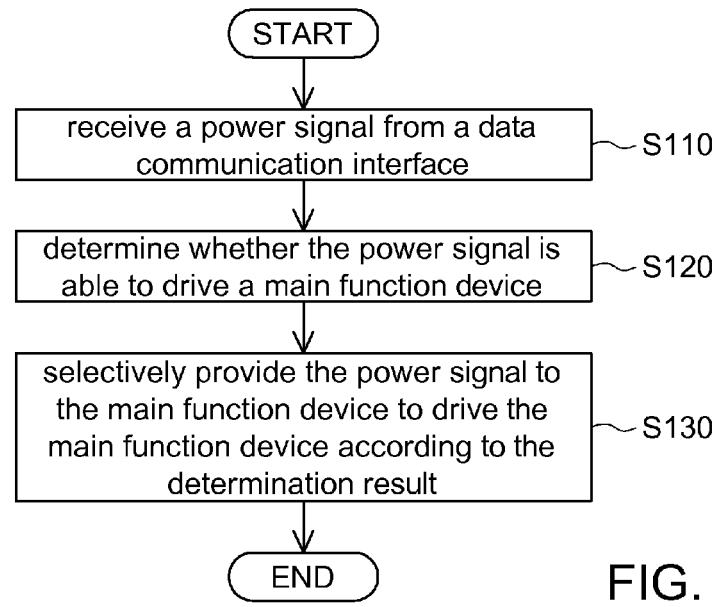
FIG. 1 shows a flow chart of a power detection method according to an embodiment of the disclosure.

FIG. 1 shows a flow chart of a power detection method according to an embodiment of the disclosure. The power detection method is applied to a peripheral apparatus. The method includes the following steps. First, as shown in step S110, a power signal is received from a data communication interface. Next, in step S120, it is determined whether the power signal is able to drive a main function device of the peripheral apparatus. Following that, in step S130, the power signal is provided to the main function device to drive the main function device selectively according to the determination result.

Figure 2:
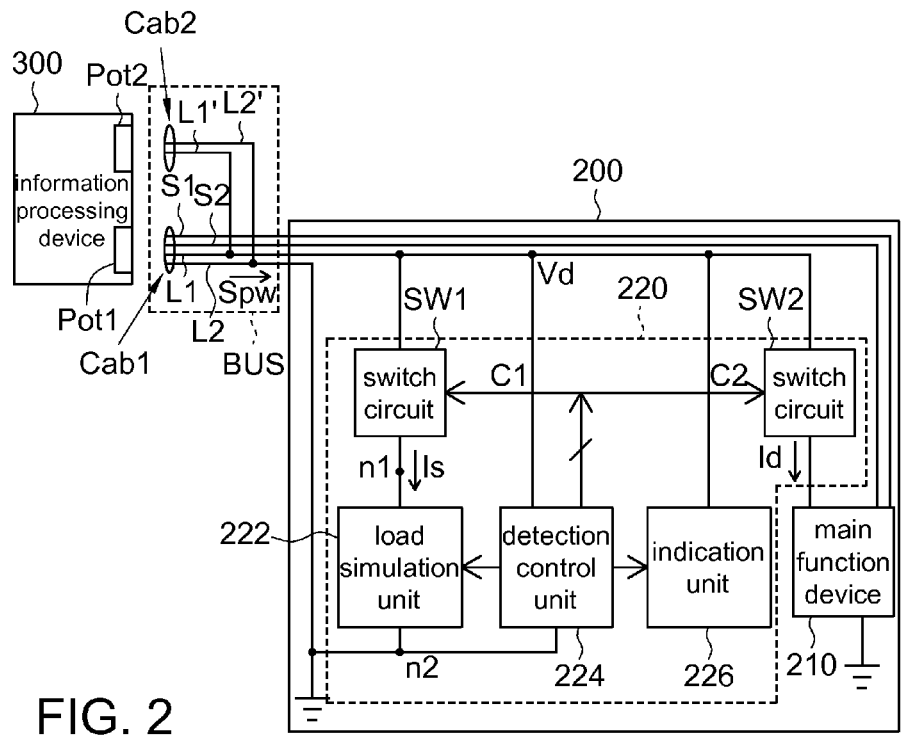
FIG. 2 is a block diagram showing a peripheral apparatus according to an embodiment of the disclosure.

The peripheral apparatus which applies the power detection method will be made as an example for further description below. FIG. 2 is a block diagram showing a peripheral apparatus 200 according to an embodiment of the disclosure.

The peripheral apparatus 200 includes a main function device 210 and a power detection module 220. In practical applications, the main function device 210 may be, for example, applied to an external optical disc drive, such as an external slim optical disc drive, or an external hard disk drive. The power detection module 220 receives a power signal Spw from a data communication interface BUS. The power signal Spw may be, for example, coming from an information processing device 300, such as a desktop computer or a notebook computer. The data communication interface BUS may be, for example, an interface complied with a protocol based on universal serial bus (USB), such as an interface of USB 1.0 or USB 2.0.

In an embodiment, the peripheral apparatus 200 further includes an input port (not shown) for connecting at least one cable equipped with the data communication interface. As shown in FIG. 2, the peripheral apparatus 200 includes two cables Cab1 and Cab2. The cable Cab1 includes, for example, a pair of power lines L1 and L2 as well as a pair of signal lines S1 and S2, while the cable Cab2 includes, for example, a pair of power lines L1' and L2'. As shown in FIG. 2, the two pairs of power lines L1 and L2 as well as L1' and L2' are connected in parallel. The power signal Spw is transmitted to the peripheral apparatus 200 through the power lines L1 and L2, or through the two pairs of power lines L1, L2, and L1', L2' if both of the cables Cab1 and Cab2 are plugged into the information processing device 300. In order to comply with the USB protocol, the power lines L1 and L2 (or L1' and L2') may be the positive power line VBUS (+5V) and the negative power line GND (0V), respectively, and the signal lines S1 and S2 may be USB D+ and USB D− lines, respectively. In another embodiment, one end of the cable can be incorporated in the peripheral apparatus 200. Thus, the cable suitable for the peripheral apparatus 200 can be a cable capable of being plugged in and pulled out, or a cable being directly incorporated in the peripheral apparatus 200.

The peripheral apparatus 200 determines whether the power signal Spw is able to drive the main function device 210 when the peripheral apparatus 200 receives the power signal Spw from the data communication interface BUS. That is, the peripheral apparatus 200 determines whether the power signal Spw has sufficient electric power for the main function device 210 to operate in accordance with the requirement of voltage, current or power for the device. As such, in different examples, the peripheral apparatus 200 can be implemented as one which makes the determination according to different electrical specification of different main function devices.

The power detection module 220 includes, for example, a load simulation unit 222 and a detection control unit 224. An example of the way that the peripheral apparatus 200 determines whether the power signal Spw is able to drive the main function device 210 is as follows. The load simulation unit 222 draws a predetermined current Is corresponding to the power signal Spw under control of the detection control unit 224. Next, the detection control unit 224 determines whether a supplied voltage Vd corresponding to the power signal Spw is lower than a predetermined voltage, thus deciding whether the power signal Spw is able to drive the main function device 210 or not.

In general, the main function device 210 in operation usually draws a load current Id corresponding to the power signal Spw from the information processing device 300. The applicant found that when the information processing device 300 is providing the load current Id, the level of the supplied voltage Vd is influenced by the load current Id, due to limited supply power (or normal rated power) of the power signal Spw provided by the information processing device 300. In a worse case, the level of the supplied voltage Vd may be affected by high load current Id so as to decrease to a level failing to drive the main function device 210 normally. In such situation, the main function device 210 would produce unstable operations.

In this embodiment, the predetermined current Is drawn by the load simulation unit 222 may be, for example, a current relative to the main function device 210. In other words, the value of the predetermined current Is can be designed with reference to different load currents drawn by different main function devices 210, or with reference to the load current Id drawn by the main function device 210 operating at different functions. Likewise, the value of the predetermined voltage can also be designed with reference to different main function devices 210. For example, the predetermined current Is can be designed as a current which the main function device 210 draws under normal rated power, or can be designed as one of an average current and a maximum current (peak value) which the main function device 210 needs when performing different operations. As for determining the predetermined voltage, we can conduct certain experiments to search the lowest voltage level which allows the main function device 210 operate normally. However, this disclosure is not limited thereto. The way for determining the predetermined current and the predetermined voltage can be designed with reference to different main function devices and different requirements.

In this embodiment, the load simulation unit 222 draws the predetermined current Is, so that the supplied voltage Vd provided by the information processing device 300 is affected accordingly and its voltage level is thus decreased. In this way, during the process of determining whether the power signal Spw is able to drive the main function device 210, the detection control unit 224 can adopt voltage detection to determine whether the supplied voltage Vd is lower than a predetermined voltage which is unable to cause the main function device 210 operate normally, thus determining whether the power signal Spw can drive the main function device 210 or not.

For example, if the detection control unit 224 determines that the supplied voltage Vd is lower than the predetermined voltage, the detection control unit 224 then determines that the power signal Spw is unable to drive the main function device 210, and will not provide the power signal Spw to the main function device 210. Therefore, in this embodiment, the main function device 210 will not be allowed to receive the power signal Spw when the supplied voltage Vd is lower than a level which is unable to cause the main function device 210 operate normally, thus preventing the main function device 210 from unstable operation.

Moreover, if the detection control unit 224 determines that the supplied voltage Vd is higher than the predetermined voltage, the detection control unit 224 then determines that the power signal Spw is able to drive the main function device 210 and provides the power signal Spw to the main function device 210 while stops drawing the predetermined current Is.

In this case, because the level of the supplied voltage Vd for use in the main function device 210 has passed the verification ensuring that its voltage level is capable of making the main function device 210 operate normally, it is ensured that users can operate the main function 210 normally. Thus, this embodiment can ensure the main function device 210 operate normally.

Besides, in an embodiment, in order for the user to conveniently know about the determination result of whether the power signal Spw is able to drive the main function device 210 or not, the power detection module 220 further includes an indication unit 226. The indication unit 226 provides an associated indication message under control of the detection control unit 224. Thus, the user can determine his or her subsequent action in response to the indication message. In a practical example, the indication unit 226 can be, for example, but without being limited to, implemented with at least one of a light-emitting diode (LED) and a buzzer.

For example, in an embodiment where the indication unit 226 is implemented with the LED, if the detection control unit 224 determines that the supplied voltage Vd is lower that the predetermined voltage, then the indication unit 226 triggers the LED to show a first indication message, such as flashing red light, under control of the detection control unit 224, so as to indicate that the peripheral apparatus 200 is currently in an abnormal situation, for example, there is no power supplied to the main function device 210 or the power signal Spw is lower than the predetermined voltage. Correspondingly, if the detection control unit 224 determines that the supplied voltage Vd is higher than the predetermined voltage, the indication unit 226 triggers the LED to show a second indication message, such as green light, under control of the detection control unit 224, so as to indicate that the peripheral apparatus 200 is currently in a normal situation, for example, that the main function device can receive the power normally.

The LED mentioned above is made as an example for illustration, but the indication unit 226 of this embodiment is not limited thereto. In another embodiment where the indication unit 226 is implemented with the buzzer, the buzzer can also be utilized to provide a corresponding indicating sound. However, as long as an indication message corresponding to the determination result is provided by using the indication unit 226, such an alternative is not apart from the scope of the disclosure.

Figure 3:
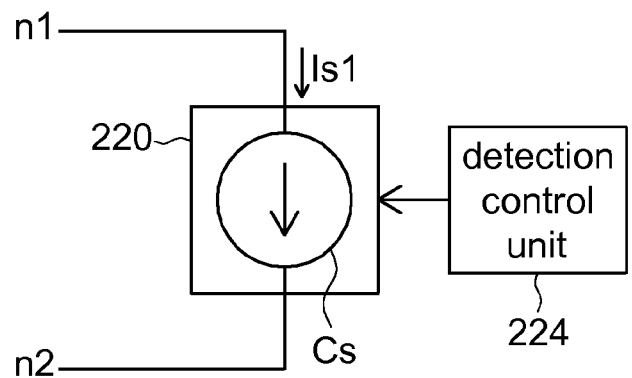
FIGS. 3 and 4 are schematic diagrams each showing an example of the load simulation unit in FIG. 2 which draws the continuous current and the pulse current.
Figure 4:
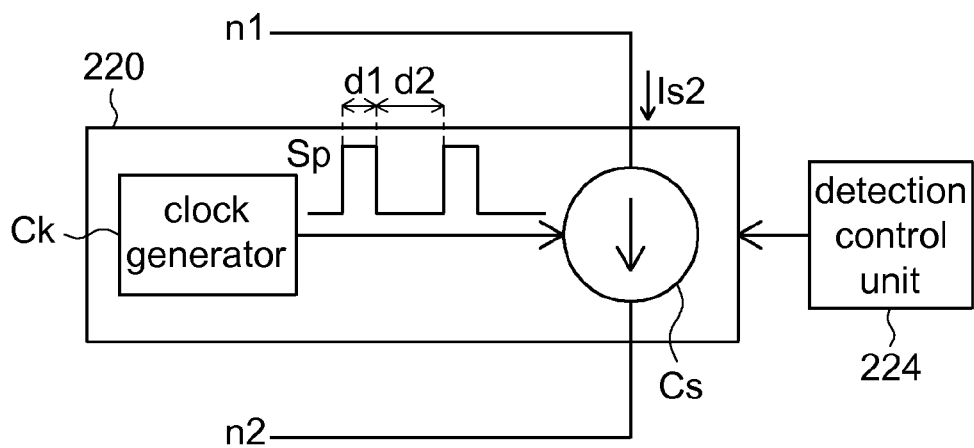

Two examples are used to demonstrate the predetermined current Is which the load simulation unit 222 draws. In the two examples, the predetermined current Is can be, for example, a continuous current Is1 or a pulse current Is2. And the load simulation unit 222 can designed respectively. FIGS. 3 and 4 are schematic diagrams showing two examples of the load simulation unit 222 in FIG. 2 which draw the continuous current and the pulse current, respectively. The load simulation unit 222 illustrated in the two examples has two ends n1 and n2 which are connected to the power lines L1 and L2, respectively, through the switch circuit SW1 for receiving the power signal Spw.

In FIG. 3, the load simulation unit 222 includes a constant current circuit Cs. The constant current circuit Cs is for drawing the current Is1. In a practical example, the constant current circuit Cs may be, for example, a current source circuit which is under control of the detection control unit 224, and the current flowing through the constant current source circuit Cs is the continuous current Is1 in substantial.

In FIG. 4, the load simulation unit 222 includes a constant current circuit Cs and a clock generator Ck. The clock generator Ck is for providing a pulse signal Sp to trigger the constant current circuit Cs. The constant current circuit Cs is under control of the detection control unit 224, and the current flowing through the constant current circuit Cs being triggered by the pulse signal Sp is the pulse current Is2 in substantial. Moreover, the current Is2 may have a pulse width in microseconds (μs). For example, the current Is2 may have a pulse width of 50 μs as shown in time period d1, and have a duration at low level about 200 μs as shown in time period d2.

Besides, referring to FIG. 2, the power detection module 220 in this embodiment may further include a switch circuit SW1. The switch circuit SW1 selectively switches on under control of the detection control unit 222, and makes the load simulation unit 222 draw the predetermined current Is through the switch circuit SW1 being switched on.

Moreover, in this embodiment, the power detection module 220 may further include a switch circuit SW2. The switch circuit SW2 selectively provides the power signal Spw to the main function device 210 under control of the detection control unit 224. Specifically, if the detection control unit 224 determines that the power signal Spw is able to drive the main function device 210, the detection control unit 224 enables the switch circuit SW2 and thus provides the power signal Spw to the main function device 210. Correspondingly, if the detection control unit 224 determines that the power signal Spw is unable to drive the main function device 210, the detection control unit 224 disables the switch circuit SW2 and thus will not provide the power signal Spw to the main function device 210. Thus, the power signal Spw can selectively provide to the main function device 210 by controlling the switch circuit SW2.

Figure 5:
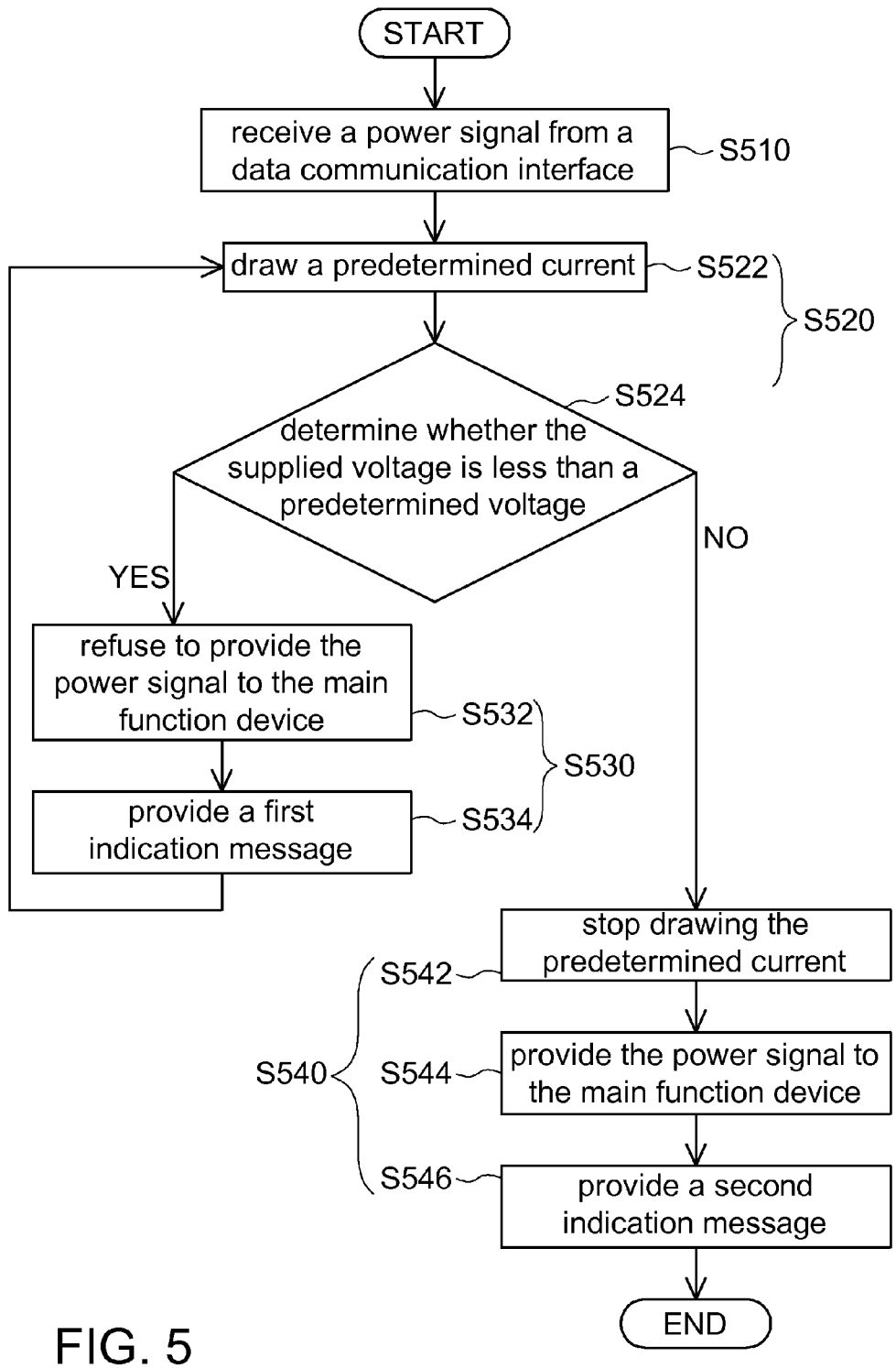
FIG. 5 is a detailed flow chart of the power detection method applied to the peripheral apparatus in FIG. 2.

FIG. 5 is a detailed flow chart of the power detection method applied to the peripheral apparatus 200 in FIG. 2. Referring to both of the FIGS. 2 and 5, the method includes the following steps.

In step S510, a power signal Spw is received from a data communication interface BUS. For example, the user may first plug the cable Cab1 into the connection port Pot1 of the information processing device 300, so that the peripheral apparatus 200 can be connected to the information processing device 300 through data communication interface BUS and thus to receive the power signal Spw provided by the information processing device 300. Afterwards, the user may decide whether to plug the cable Cab2 into connection port Pot2 of the information processing device 300 or not depending on the follow-up situation.

Next, in step S520, it is determined that whether the power signal Spw is able to drive the main function device 210. Step S520 includes steps S522 and S524. Specifically, in step S522, the power detection unit 224 enables the switch circuit SW1 and makes the load simulation unit 222 draw the predetermined current Is corresponding to the power signal Spw. In step S524, the detection control unit 224 determines whether the supplied voltage Vd corresponding to the power signal Spw is lower than the predetermined voltage.

If the power detection unit 224 determines that the supplied voltage Vd is lower than the predetermined voltage, then enters step S530. Step S530 includes steps S532 and S534. In step S532, the detection control unit 224 disables the switch circuit SW2 and thus the power signal Spw will not be provided to the main function device 210. In step S534, the power detection control unit 224 controls the indication unit 226 to provide a first indication message, such as flashing red light, which implies that the user may need to plug the cable Cab2 into the information processing device 300. Then, the method proceeds to step S520 and makes the peripheral apparatus 200 continue to determine whether the power signal Spw is able to drive the main function device 210 or not.

Correspondingly, if the detection control unit 224 determines that the supplied voltage Vd is higher than the predetermined voltage, then enters step S540. Step S540 includes steps S542, S544, and S546. In step S542, the detection control unit 224 disables the switch circuit SW1 to stop drawing the predetermined current Is. In step S544, the detection control unit 224 enables the switch circuit SW2 so as to provide the power signal Spw to the main function device 210. In step S546, the detection control unit 224 controls the indication unit 226 to provide a second indication message, such as green light, so as to inform the user that the main function device 210 can be used normally.

As shown in FIG. 5, it is assumed that the user first plug the cable Cab1 into the information processing device 300 when using the peripheral apparatus 200. In this way, if the indication unit 226 of the peripheral apparatus 200 provides the above-mentioned first message, such as flashing red light, the user can then plug the cable Cab2 into another socket (or connection port) of information processing device 300 in different location from the one receiving cable Cab1, so that the peripheral apparatus 200 can receive a power signal Spw with higher driving power. As such, after the peripheral apparatus 200 determines that the power signal Spw is able to drive the main function device 210, the indication unit 226 is controlled to provide the second message, such as green light, which implies that the main function device 210 can operate normally and is ready for use.

Figure 6A:
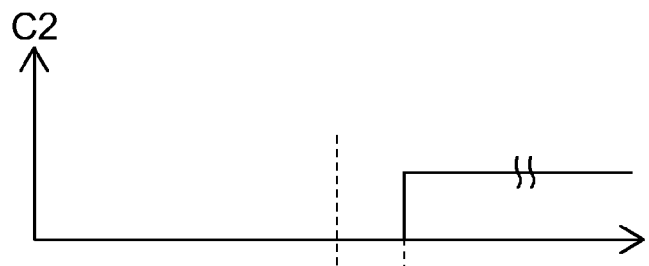
FIGS. 6A to 6D shows an example of a number of signal waveforms in the peripheral apparatus in FIG. 2.
Figure 6B:
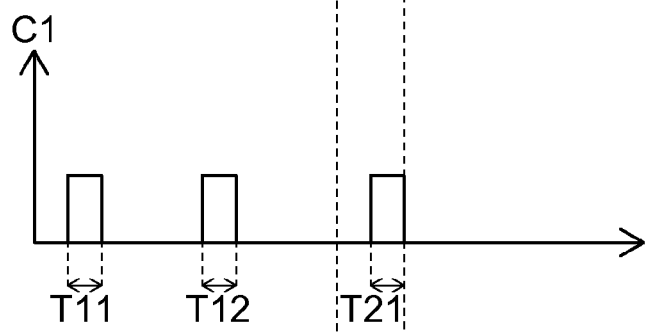
Figure 6C:
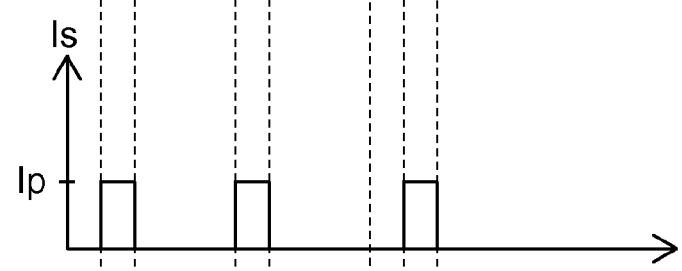
Figure 6D:
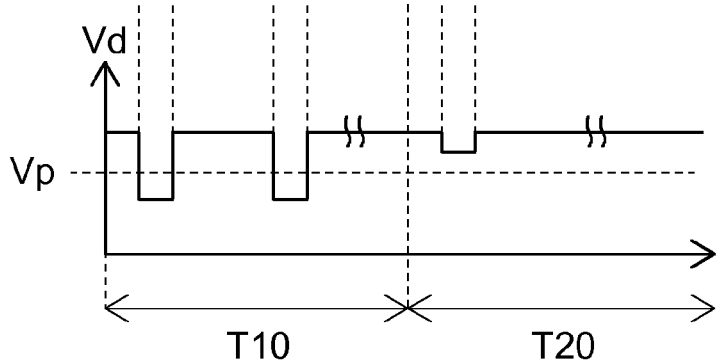

FIGS. 6A to 6D show an example of a number of signal waveforms measured in the peripheral apparatus 200 in FIG. 2. In this example, the level Ip of the predetermined current Is is designed as a level of 1.2 A while the level Vp of the predetermined voltage is designed as a level of 4.3 Volts. FIG. 6A depicts the status of the signal controlling the switch circuit SW2, FIG. 6B depicts the status of the signal controlling the switch circuit SW1, FIG. 6C depicts the amplitude of the predetermined current Is being drawn corresponding to the power signal Spw, and FIG. 6D depicts the amplitude of the supplied voltage Vd corresponding to the power signal Spw. Further description will be made below with reference to FIG. 5.

Initially, it is assumed that the user may firstly plug the cable Cab1 into the information processing device 300 when step S510 of this embodiment is performed. Next, this embodiment executes step S520 to determine whether the power signal Spw is able to drive the main function device 210 or not. At this time, the detection control unit 224 transmits the switch control signal C1 to the switch circuit SW1 during the time period T11 shown in FIG. 6B, so as to enable the switch circuit SW1 and thus draws the predetermined current Is corresponding to the power signal Spw. Meanwhile, as shown in FIG. 6D, the level of the supplied voltage Vd is decreased, and is lower than 4.3 V of the predetermined voltage Vp. Hence, in this embodiment, the detection control unit 224 does not transmit the switch control signal C2 to the switch circuit SW2 after the time period T11, so that the switch circuit SW2 is disabled. Afterwards, as shown in time period T12, this embodiment executes step S520 again to determine whether the power signal Spw is able to drive the main function device 210 or not. In other words, this embodiment executes step S520 continuously until the system determines that the power signal Spw is able to drive the main function device 210. Prior to that, the switch circuit SW2 is disabled, and the power signal Spw is not provided to the main function device 210.

Following that, it is assumed that the user then plugs the cable Cab2 into the information process apparatus 300 after the time period T10. During the time period T21, this embodiment executes step S520 to determine whether the power signal Spw is able to drive the main function device 210 or not. Likewise, the switch circuit SW1 is enabled. Moreover, as shown in FIG. 6D, the level of the supplied voltage Vd is decreased, but is higher than the level of the predetermined voltage Vp. Thus, after the time period T21, the detection control unit 224 in this embodiment transmits the switch control signal C2 to the switch circuit SW2 to enable it, and provides the power signal Spw to the main function device 210 as shown in FIG. 6A.

Further, in order to improve the recognition in distinguishing between the two cables Cab1 and Cab2 as well as to increase the convenience for the user, the color of the cable Cab2 can be designed as one different from that of the cable Cab1. Therefore, the user can easily distinguish between the two cables Cab1 and Cab2 with different internal wiring from their colors of appearance when using the peripheral apparatus 200. Thus, the user can know that which cable should be first used (e.g. the cable Cab1) depending on the color, and thus increasing the convenience for the user.

Besides, in another embodiment, in order to provide the user with higher usage flexibility, the length of the cable Cab2 can be designed as one longer than that of the cable Cab1. Because the power provided from adjacent connection ports of the information processing device 300 (e.g. notebook computer) may be controlled by one current limited integrated circuit (IC), even if two cables Cab1 and Cab2 are connected to two adjacent connection ports Pot1 and Pot2, we may be unable to obtain a power signal with sufficient driving power. In this embodiment, the length of the cable Cab2 is longer that that of the cable Cab1, so that the user can use the cable Cab1 to connect the peripheral apparatus 200 to a connection port, and user the cable Cab2 to connect the peripheral apparatus 200 to another connection port located farther and corresponding to another current limited IC, and thus obtaining a power signal with higher driving power. Therefore, in this embodiment, the peripheral apparatus 200 is not limited to be connected to two adjacent connection ports, and thus providing higher usage flexibility.

In the method and module for power detection and the peripheral apparatus using the same disclosed in the embodiments of the disclosure mentioned above, it is determined that whether a power signal, which is received from a data communication interface, is able to drive a main function device or not, and the power signal is selectively provided to the main function device to drive the main function device according to the determination result. In this way, the power signal of the data communication interface can thus be correctly and efficiently applied to the peripheral apparatuses with different electrical specification, especially to the external storing device, and thus preventing the operation of the main function device from being influenced by unstable power signal. Therefore, the user can make use of the main function device normally and conveniently when the power is reliable, which can avoid the event of using power signal directly under unknown circumstances, and thus avoid the situations of losing data unexpectedly or degrading the system operation as a whole.

While the disclosure has been described by way of example and in terms of a number of preferred embodiments, it is to be understood that the disclosure is not limited to those embodiments. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power detection method for use in a peripheral apparatus, comprising:
   receiving a power signal from a data communication interface;
   determining whether the received power signal is able to drive a main function device of the peripheral apparatus, drawing a predetermined current corresponding to the power signal; and
   determining whether a supplied voltage corresponding to the power signal is lower than a predetermined voltage; and
   according to the determination result, selectively providing the power signal to the main function device to drive the main function device.

2. The method according to claim 1, wherein if the supplied voltage is lower than the predetermined voltage, it is determined that the power signal is unable to drive the main function device, and the step of selectively providing the power signal to the main function device comprises: causing the power signal not to be provided to the main function device; wherein after determining that the supplied voltage is lower than the predetermined voltage, it further comprises: proceeding to the step of determining whether the power signal is able to drive the main function device.

3. The method according to claim 1, wherein if the supplied voltage is higher than the predetermined voltage, it is determined that the power signal is able to drive the main function device, and the step of selectively providing the power signal to the main function device comprises: providing the power signal to the main function device; and stopping drawing the predetermined current.

4. The method according to claim 1, wherein the predetermined current is a continuous current or a pulse current.

5. The method according to claim 1, further comprising: providing a corresponding indication message according to the determination result.

6. The method according to claim 1, wherein the data communication interface is an interface complied with a protocol based on universal serial bus (USB).

7. A peripheral apparatus, comprising:
   a main function device; and
   a power detection module, for receiving a power signal from a data communication interface and determining whether the power signal is able to drive the main function device, and for selectively providing the power signal to the main function device to drive the main function device according to the determination result, the power detection module comprises:
   a load simulation unit, for drawing a predetermined current corresponding to the power signal; and
   a detection control unit, for controlling the load simulation unit to draw the predetermined current, and for determining whether a supplied voltage corresponding to the power signal is lower than a predetermined voltage, so as to determine whether the power signal is able to drive the main function device.

8. The apparatus according to claim 7, wherein the power detection module comprises: a second switch circuit, for selectively providing the power signal to the main function device under control of the power detection module; wherein if the power detection module determines that the power signal is able to drive the main function device, the power detection module enables the second switch circuit and thus provides the power signal to the main function device; and if the power detection module determines that the power signal is unable to drive the main function device, the power detection module disables the second switch circuit and thus does not provide the power signal to the main function device.

9. The apparatus according to claim 7, wherein if the detection control unit determines that the supplied voltage is lower than the predetermined voltage, the detection control unit causes the power signal not to be provided to the main function device and proceeds to determine whether the power signal is able to drive the main function device; wherein if the detection control unit determines that the supplied voltage is higher than the predetermined voltage, the detection control unit provides the power signal to the main function device and stops drawing the predetermined current.

10. The apparatus according to claim 7, wherein the power detection module further comprises: a first switch circuit, for selectively being switched on under control of the detection control unit, wherein when the first switch circuit is switched on, the load simulation unit draws the predetermined current through the first switch circuit.

11. The apparatus according to claim 7, wherein the predetermined current is a continuous current and the load simulation unit comprises: a constant current circuit for drawing the continuous current.

12. The apparatus according to claim 7, wherein the predetermined current is a pulse current and the load simulation unit comprises: a constant current circuit; and a clock generator, for providing a pulse signal to trigger the constant current circuit so as to make the constant current circuit draw the pulse current.

13. The apparatus according to claim 7, wherein the power detection module further comprises: an indication unit, for providing a corresponding indication message under control of the detection control unit.

14. The apparatus according to claim 7, further comprising: at least one cable, equipped with the data communication interface, having one end incorporated in the peripheral apparatus.

15. The apparatus according to claim 14, wherein the at least one cable comprises a first cable and a second cable, the first cable has a pair of first power lines and a pair of signal lines, the second cable has a pair of second power lines, and the two pairs of the power lines are connected in parallel.

16. The apparatus according to claim 15, wherein the length of the second cable is longer than that of the first cable and/or the color of the second cable is different from that of the first cable.

17. The apparatus according to claim 7, wherein the data communication interface is an interface complied with a protocol based on universal serial bus (USB).

18. The apparatus according to claim 8, wherein the main function device is applied to an external optical disc drive (ODD) or an external hard disk drive.

19. A power detection module applied to a peripheral apparatus, comprising:
   a load simulation unit, for drawing a predetermined current corresponding to a power signal from a data communication interface; and
   a detection control unit, for controlling the load simulation unit to draw the predetermined current, and for determining whether a supplied voltage corresponding to the power signal is lower than a predetermined voltage, so as to determine whether the power signal is able to drive a main function device;
   wherein if the detection control unit determines that the supplied voltage is lower than the predetermined voltage, the detection control unit determines that the power signal is unable to drive the main function device and causes that the power signal is not provided to the main function device.

20. The module according to claim 19, further comprising: a second switch circuit, for selectively providing the power signal to the main function device under control of the detection control unit; wherein if the detection control unit determines that the power signal is able to drive the main function device, the detection control unit enables the second switch circuit and thus provides the power signal to the main function device; and if the detection control unit determines that the power signal is unable to drive the main function device, the detection control unit disables the second switch circuit and thus does not provide the power signal to the main function device.

21. The module according to claim 19, wherein if the detection control unit determines that the supplied voltage is higher than the predetermined voltage, the detection control unit determines that the power signal is able to drive the main function device, then provides the power signal to the main function device, and stops drawing the predetermined current.

22. The module according to claim 19, further comprising: a first switch circuit, for selectively being switched on under control of the detection control unit, wherein when the first switch circuit is switched on, the load simulation unit draws the predetermined current through the first switch circuit.

23. The module according to claim 19, wherein the predetermined current is a continuous current and the load simulation unit comprises: a constant current circuit for drawing the continuous current.

24. The module according to claim 19, wherein the predetermined current is a pulse current and the load simulation unit comprises: a constant current circuit; and a clock generator, for providing a pulse signal to trigger the constant current circuit so as to make the constant current circuit draw the pulse current.

25. The module according to claim 19, further comprising: an indication unit, for providing a corresponding indication message under control of the detection control unit.

* * * * *